(12) United States Patent
Fornage

(10) Patent No.: US 9,774,189 B2
(45) Date of Patent: Sep. 26, 2017

(54) METHOD AND APPARATUS FOR MULTI-PHASE POWER CONVERSION HAVING MODIFIED BURST CURRENT

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 901 days.

(21) Appl. No.: 13/185,422

(22) Filed: Jul. 18, 2011

(65) Prior Publication Data

US 2013/0021006 A1  Jan. 24, 2013

(51) Int. Cl.
| | |
|---|---|
| H02M 3/24 | (2006.01) |
| H02J 3/32 | (2006.01) |
| H02M 7/48 | (2007.01) |
| H02J 3/38 | (2006.01) |
| H02M 1/00 | (2006.01) |

(52) U.S. Cl.
CPC ............. *H02J 3/32* (2013.01); *H02J 3/385* (2013.01); *H02M 7/48* (2013.01); *H02M 2001/007* (2013.01); *Y02E 10/58* (2013.01); *Y02E 70/30* (2013.01)

(58) Field of Classification Search
CPC .... H02M 7/49; H02M 7/493; H02M 3/33507; H02M 7/53871; H02M 5/293; H02M 7/537; H02M 7/42; H02M 7/48; H02M 2001/007; H02J 1/102; H02J 7/35; H02J 3/32; H02J 3/385; G05B 11/016; H02N 6/00; Y02E 70/30; Y02E 10/58
USPC ......... 363/71, 72, 74, 95, 98, 131, 120, 132; 323/906
See application file for complete search history.

(56) References Cited

U.S. PATENT DOCUMENTS

| | | | | |
|---|---|---|---|---|
| 5,329,222 | A * | 7/1994 | Gyugyi | H02J 3/1814 307/102 |
| 5,369,353 | A * | 11/1994 | Erdman | 323/207 |
| 7,456,604 | B2 * | 11/2008 | Kurokami et al. | 320/101 |
| 7,479,774 | B2 * | 1/2009 | Wai et al. | 323/284 |
| 7,768,155 | B2 | 8/2010 | Fornage | |
| 7,944,326 | B2 * | 5/2011 | Tucker | H02M 1/12 363/39 |
| 8,179,698 | B2 * | 5/2012 | Jang et al. | 363/17 |
| 8,350,411 | B2 | 1/2013 | Kimball et al. | |
| 8,374,011 | B2 * | 2/2013 | Wirth | 363/131 |
| 8,624,439 | B2 * | 1/2014 | Marcianesi et al. | 307/82 |
| 2003/0202367 | A1 * | 10/2003 | Schreiber | 363/72 |
| 2007/0221267 | A1 | 9/2007 | Fornage | |

(Continued)

OTHER PUBLICATIONS

International Search Report and Written Opinion mailed May 10, 2012 for PCT Application No. PCT/US2011/044478, 9 pages.

(Continued)

*Primary Examiner* — Alex Torres-Rivera
(74) *Attorney, Agent, or Firm* — Moser Taboada

(57) ABSTRACT

A method and apparatus for power conversion. In one embodiment, an apparatus includes a power conversion module for converting a first current to a second current, where the first current or the second current is an AC current having at least two phases. The apparatus also includes a waveform modification module, coupled to the power conversion module, for modifying the AC current to generate a modified AC current, where each phase of the modified AC current has a value of zero at the beginning of an AC line cycle.

20 Claims, 5 Drawing Sheets

(56) References Cited

U.S. PATENT DOCUMENTS

| | | | |
|---|---|---|---|
| 2009/0003481 A1* | 1/2009 | Schopfer | H04B 3/542 307/3 |
| 2009/0079383 A1 | 3/2009 | Fornage et al. | |
| 2009/0230782 A1 | 9/2009 | Fornage | |
| 2010/0020570 A1 | 1/2010 | Melanson et al. | |
| 2010/0091532 A1 | 4/2010 | Fornage | |
| 2012/0223748 A1* | 9/2012 | Habbley | H02M 5/293 327/141 |
| 2012/0281444 A1* | 11/2012 | Dent | 363/56.01 |

OTHER PUBLICATIONS

Sol Kim et al., "Implementation of Indirect Field-Oriented Control of Linear Induction Motor using Voltage Source Inverter", 1999 ICEE, pp. 263-266, 1999.

Christian Klumpner, Ion Boldea, "The Matrix Converter: Overvoltages Caused by the Input Filter, Bidirectional Power Flow, and Control for Artificial Loading of Induction Motors", 2000 Electric Machines and Power Systems, pp. 129-142, 2000.

Jantsch et al. "AC PV Module Inverters With Full Sine Wave Burst Operation Mode for Improved Efficiency of Grid Connected Systems at Low Irradiance", 14th E.C. Photovoltaic Solar Energy Conference. Barcelona, Spain, pp. 1344-1347, Jun. 30, 1997.

Hu et al., "Efficiency Improvement of Grid-Tied Inverters at Low Input Power Using Pulse-Skipping Control Strategy", IEEE Transactions on Power Electronics, vol. 25, Issue 12, pp. 3129-3138, Dec. 1, 2010.

European Patent Office Substantive Search Report, Application No. 11869751.5-1804 / 2735093 PCT/US2011044478, 9 Pages, Feb. 16, 2015.

U.S. Appl. No. 61/490,327, filed May 26, 2011, entitled "Method and Apparatus for Generating Single-Phase Power From a Three-Phase Resonant Power Converter", 32 pages.

* cited by examiner

METHOD AND APPARATUS FOR MULTI-PHASE POWER CONVERSION HAVING MODIFIED BURST CURRENT

BACKGROUND OF THE INVENTION

Field of the Invention

Embodiments of the present disclosure generally relate to power conversion and, more particularly, to a method and apparatus for transferring power with respect to a multi-phase AC line.

Description of the Related Art

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

During periods of operating at low power, such as during low irradiance or when the solar irradiance on a PV module changes from no irradiance to increasing irradiance, an inverter coupled to the PV module may suffer from a lower efficiency. In order to improve the inverter efficiency during such periods, the inverter may store energy for a time period and subsequently "burst" the stored energy to the commercial power grid. When bursting power onto a multi-phase AC line, an abrupt power transfer from no power output to generating power at different levels for the various phases results in stress on components of the inverter as well as unwanted effects on the grid, such as noise, transient distortion, and flicker.

Therefore, there is a need in the art for a method and apparatus for efficiently transferring power with respect to a multi-phase line.

SUMMARY OF THE INVENTION

Embodiments of the present invention generally relate to a method and apparatus for power conversion. In one embodiment, an apparatus comprises a power conversion module for converting a first current to a second current, wherein the first current or the second current is an AC current having at least two phases; and a waveform modification module, coupled to the power conversion module, for modifying the AC current to generate a modified AC current, wherein each phase of the modified AC current has a value of zero at the beginning of an AC line cycle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
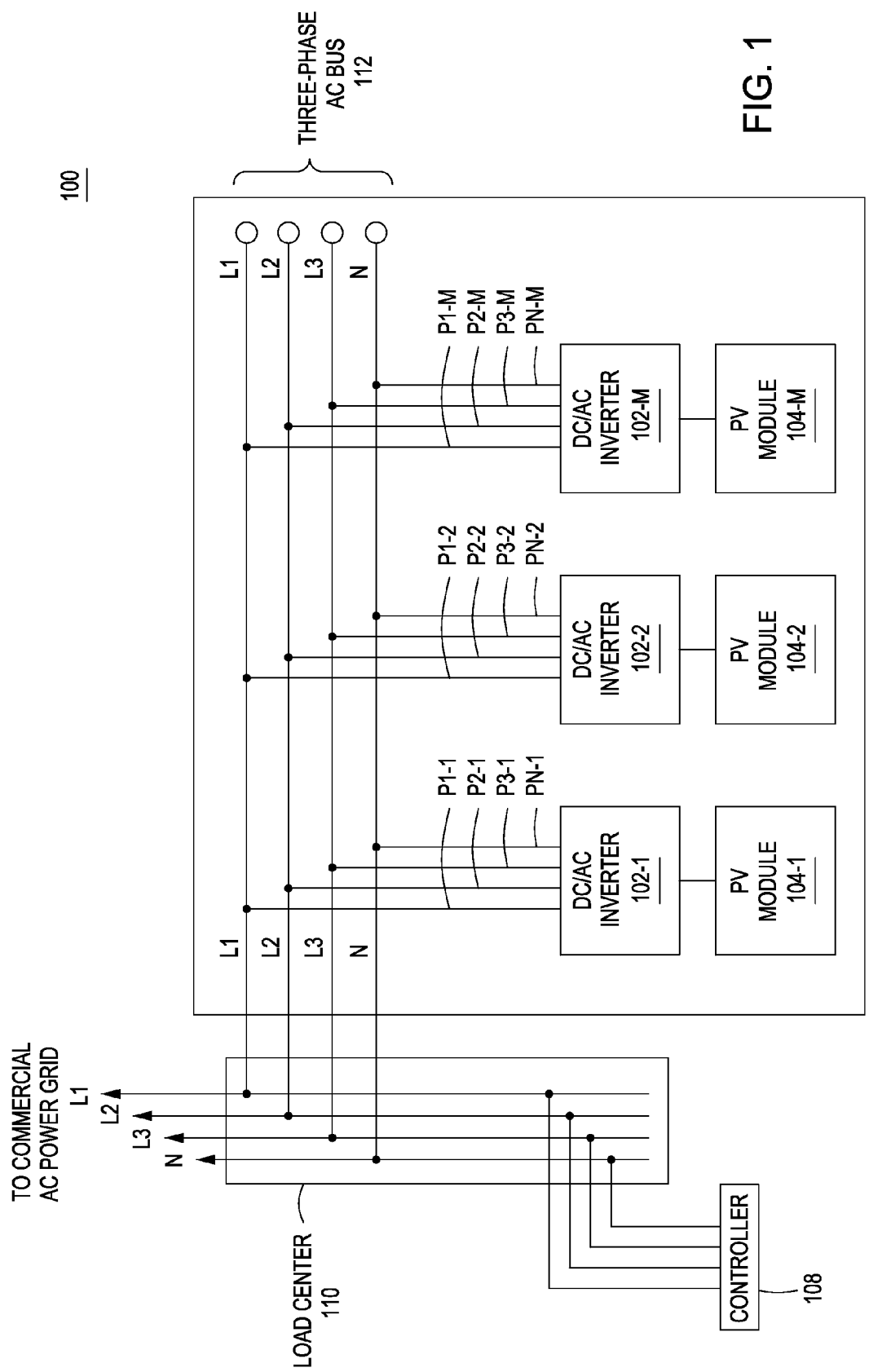
FIG. 1 is a block diagram of a three-phase power generation system in accordance with one or more embodiments of the present invention.

FIG. 1 is a block diagram of a three-phase power generation system 100 in accordance with one or more embodiments of the present invention. This diagram only portrays one variation of the myriad of possible system configurations. The present invention can function in a variety of environments and systems.

The three-phase power generation system 100 ("system 100") comprises a plurality of PV modules 104-1, 104-2 . . . 104-M, collectively referred to as PV modules 104, and a plurality of power conversion devices, such as DC-AC inverters 102-1, 102-2 . . . 102-M, collectively referred to as inverters 102. Each inverter 102-1, 102-2 . . . 102-M is coupled in a one-to-one correspondence to a PV module 104-1, 104-2 . . . 104-M, respectively, and converts DC power from the corresponding PV module 104 to multiphase AC power, such as three-phase AC power as depicted in FIG. 1. In some alternative embodiments, the inverters 102 may generate two-phase AC power rather than three-phase. One example of such a DC-AC inverter may be found in co-pending, commonly assigned U.S. Provisional Patent Application Ser. No. 61/490,327, filed May 26, 2011 and entitled "Method and Apparatus for Generating Single-Phase Power from a Three-Phase Resonant Power Converter", which is herein incorporated in its entirety by reference.

In some embodiments, a DC-DC converter may be coupled between each PV module 104 and each inverter 102 (e.g., one converter per PV module 104). Alternatively, one or more of the inverters 102 may be coupled to multiple PV modules 104; in some such embodiments, a DC-DC converter may be coupled between each PV module 104 and the corresponding inverter 102. In some alternative embodiments, the inverters 102 may receive DC power from a DC source other than the PV modules 104.

The inverters 102 are each coupled via a three-phase AC bus 112 to power lines L1, L2, L3, and N of a three-phase AC power system at the load center 110. In some embodiments, the three-phase AC power system may be a commercial AC power grid ("power grid"), as depicted in FIG. 1. The power lines L1, L2, and L3 are live conductors each carrying a different phase of AC power and the power line N is a neutral line. Each inverter 102-1, 102-2 . . . 102-M comprises a first phase output line (P1-1, P1-2 . . . P1-M, respectively) for outputting a first phase of current, a second phase output line (P2-1, P2-2 . . . P2-M, respectively) for outputting a second phase of current, and a third phase output line (P3-1, P3-2 . . . P3-M, respectively) for outputting a third phase of current. As depicted in FIG. 1, each inverter 102-1, 102-2 . . . 102-M further comprises a neutral line output line (PN-1, PN-2 . . . PN-M, respectively) for coupling to a neutral line of the grid, although such a neutral line output line is optional and may not be present in some other embodiments.

The inverter output lines couple the three-phase AC output power generated by the inverter 102 to the three-phase AC bus 112. In some embodiments, the first phase output lines P1-1, P1-2 . . . P1-M (collectively referred to as first phase output lines P1) are coupled to line L1; the second phase output lines P2-1, P2-2 . . . P2-M (collectively referred to as second phase output lines P2) are coupled to line L2; the third phase output lines P3-1, P3-2 . . . P3-M (collectively referred to as third phase output lines P3) are coupled to line L3; and the neutral line output lines PN-1, PN-2 . . . PN-M (collectively referred to as neutral line output lines PN) are coupled to the neutral line N. In other embodiments, the output lines P1, P2, P3, and PN may be coupled to the three-phase AC bus 112 using other configurations of inverter output lines to AC grid power lines.

A controller 108 is also coupled to the lines L1, L2, L3, and N at the load center 108 and provides operational control of the inverters 102 (e.g., activating the inverters 102, deactivating the inverters 102, and the like). In some embodiments, the controller 108 may communicate with the inverters 102 via power line communication (PLC); additionally or alternatively, other types of wired and/or wireless communication techniques may be utilized for communication. The controller 108 may further be communicatively coupled to a master controller (not shown) for sending information to and/or receiving information from the master controller pertaining to operation of the inverters 102.

The inverters 102 convert DC power from the PV modules 104 to three-phase AC power (i.e., each of the three phases are offset from one another by 120°) that is commercial power grid compliant and then couple the AC power (i.e., an AC current) to the load center 110. The generated AC power is further coupled from the load center 110 to the power grid. Additionally or alternatively, the generated AC power may be coupled to one or more appliances (e.g., at a private residence or business), and/or energy generated by the inverters 102 may be stored for later use; for example, the generated energy may be stored utilizing batteries, heated water, hydro pumping, $H_2O$-to-hydrogen conversion, or the like.

Each of the inverters 102 may operate in a continuous mode or a burst mode based on the level of input power received from the corresponding PV module 104. When the level of input power to an inverter 102 exceeds a burst mode threshold $P_B$, the inverter 102 operates in a continuous mode. During the continuous mode, the inverter 102 generates a three-phase required current $I3\phi_{req}$, as described further below, to bias the PV module 104 at a DC voltage setpoint corresponding to the MPP.

When the level of received input power is below the burst mode threshold $P_B$, the inverter 102 operates in a burst mode. When operating in a burst mode, the inverter 102 stores energy received from the PV module 104 during a storage period of one or more AC grid voltage cycles (i.e., $N_{off}$ AC grid cycles) and subsequently bursts (i.e., couples) the stored energy to the AC grid during a burst period of one or more grid cycles. One example of burst mode operation may be found in commonly assigned U.S. Pat. No. 7,768,155, issued Aug. 3, 2010 and entitled "Method and Apparatus for Improved Burst Mode during Power Conversion", which is herein incorporated in its entirety by reference.

In order to mitigate effects of an abrupt power transfer when bursting multiple phases of power to the grid, the inverter 102 generates a modified three-phase burst current $I3\phi_{MB}$ (also referred to as a modified burst current) during the burst period, as described in detail further below, such that each phase of the modified burst current $I3\phi_{MB}$ has a value of zero (and in some embodiments also a slope of zero) at the beginning and the end of the burst period. Further, the modified burst current $I3\phi_{MB}$ is generated such that random bursting on a large number of inverters 102 yields a smooth aggregate current waveform on the grid, as also described further below.

The modified burst current $I3\phi_{MB}$ is generated and coupled to the grid over a 0-360° cycle of one of the grid phases; i.e., a burst period starts at the beginning of a cycle of the first, the second, or the third grid phase. The grid phase to which a particular inverter 102 synchronizes its burst periods is referred to as a "master phase". In order to achieve a substantially balanced three-phase current on the three-phase AC bus 112, the distribution of the master phase among the inverters 102 (i.e., which grid phase each inverter 102 synchronizes its burst period to) may be randomly determined or intentionally evenly distributed among the inverters 102. In some embodiments, each inverter 102 may determine which grid phase should act as its master phase based on an identification of the inverter 102 (e.g., a serial number). In other embodiments, distribution of the master phase among the inverters 102 may be achieved by varying the wiring of the inverter output lines to the three-phase AC bus 112. For example, each inverter 102 synchronizes its burst period to the grid phase coupled to inverter output line P1; a first subset of inverters 102 then have output line P1 coupled to power line L1, a second subset of inverters 102 have output line P1 coupled to power line L2, and a third subset of inverters 102 have output line P1 coupled to power line L3, with similar staggered wiring among the inverters 102 for output lines P2 and P3. By having substantially the same number of inverters 102 in each of the subsets, a substantially balanced three-phase current is coupled to the three-phase AC bus 112.

In still other embodiments, the inverter output lines P1, P2, and P3 may be coupled to lines L1, L2, and L3, respectively, and a phase rotation apparatus may be utilized (either external to the inverters 102 or internal to the inverters 102) to output different phases of power from the inverters 102 onto different power lines. One example of such a phase rotation apparatus may be found in commonly assigned, co-pending U. S. Patent Application Publication Number 2009/0230782 entitled "Apparatus for Phase Rotation for a Three-Phase AC Circuit" and filed Mar. 11, 2008. In yet other embodiments, each inverter 102 may be randomly assigned a master phase, for example by the controller 108. Other similar techniques for randomly or evenly distributing the master phase among the inverter 102 may be utilized. For a sufficient number of inverters, such techniques ensure that the first, second, and third grid phases are each utilized as a master phase by approximately or exactly equivalent numbers of inverters 102, resulting in a cumulative output from the inverters 102 of a substantially balanced three-phase current.

Figure 2:
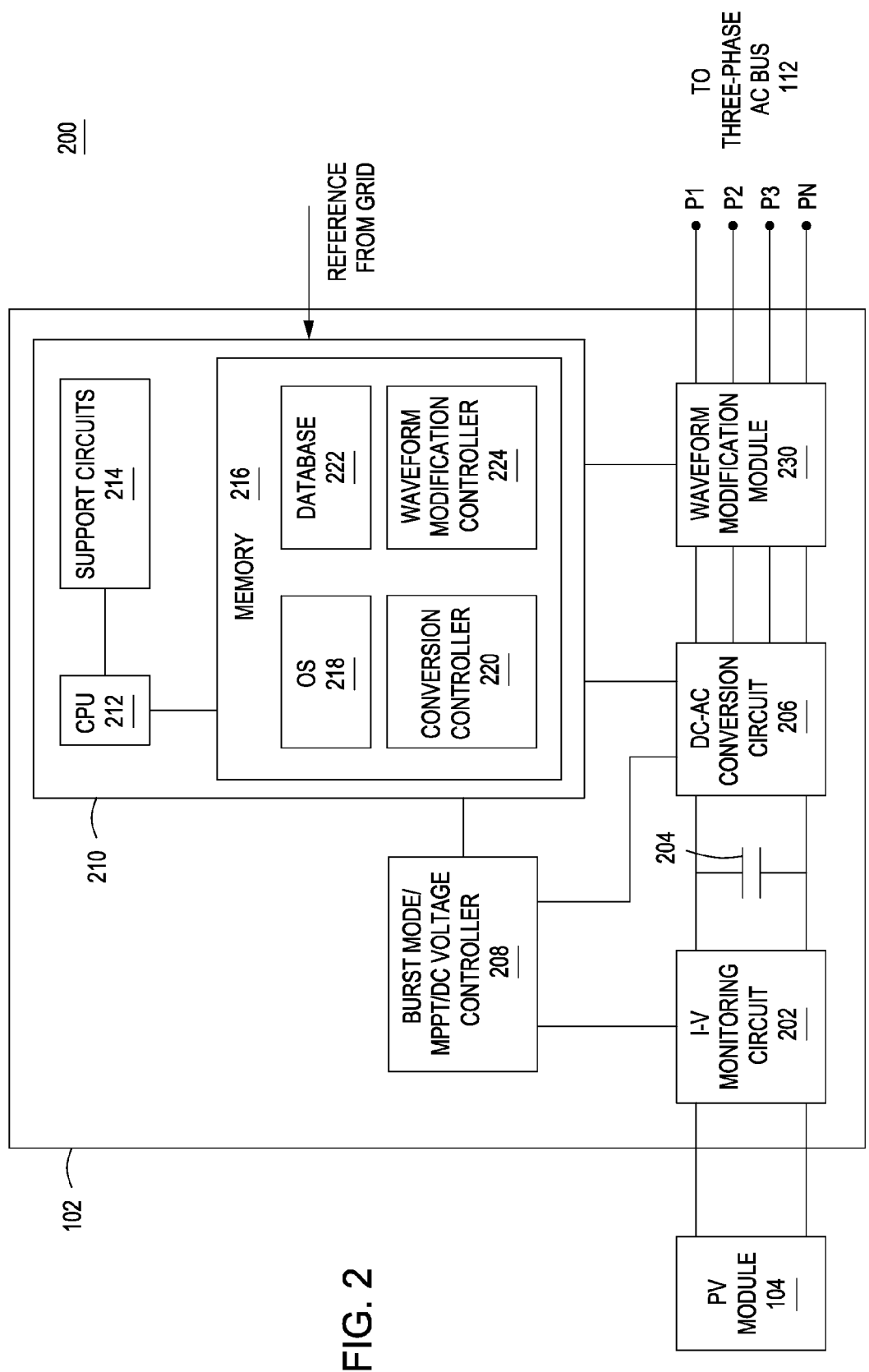
FIG. 2 is a block diagram of an inverter in accordance with one or more embodiments of the present invention.

FIG. 2 is a block diagram of an inverter 102 in accordance with one or more embodiments of the present invention. The inverter 102 comprises an I-V monitoring circuit 202, a capacitor 204, a DC-AC conversion circuit 206, a waveform modification module 230, a burst mode/MPPT/DC voltage controller 208, and a conversion control module 210. The I-V monitoring circuit 202 is coupled across the PV module 104 for receiving a DC input voltage from the PV module 104. The capacitor 204 is coupled across the output of the I-V monitoring circuit 202 and also across the input to the DC-AC conversion circuit 206; in some other embodiments, the capacitor 204 may be replaced by an alternative energy storage device. The DC-AC conversion circuit 206 is coupled via four output lines to the waveform modification module 230, and the waveform modification module 230 couples four output lines (i.e., P1, P2, P3, and PN) to the three-phase AC bus 112. The burst mode/MPPT/DC voltage controller 208 is coupled to the I-V monitoring circuit 202, the DC-AC conversion circuit 206, and the conversion control module 210. The conversion control module 210 is coupled to the DC-AC conversion circuit 206, the waveform modification module 230, and also receives a reference signal from the commercial power grid.

The I-V monitoring circuit 202 monitors the instantaneous input voltage and current, $V_{in}$ and $I_{in}$, respectively, from the PV module 104. The burst mode/MPPT/DC voltage controller 208 operates to switch the inverter 102 between continuous and burst modes, bias the PV module 104 at a DC voltage setpoint, and adjust the DC voltage setpoint such that it corresponds to the MPP voltage for the PV module 104.

When operating in continuous mode, the burst mode/MPPT/DC voltage controller 208 determines a required DC-AC conversion circuit output current such that the appropriate current is drawn from the PV module 104 to bias the PV module 104 at a desired DC voltage setpoint (i.e., at an operating current and voltage that approximately corresponds to the MPP). The DC-AC conversion circuit 206 generates the required current on each phase (i.e., $I_{req1}$ is generated on phase 1, $I_{req2}$ is generated on phase 2, and $I_{req3}$ is generated on phase 3) as driven by the burst mode/MPPT/DC voltage controller 208 and the conversion control module 210. As a result, the DC-AC conversion circuit 206 generates a three-phase required current $I3\phi_{req}$ and current is drawn from the PV module 104 to bias the PV module 104 at a DC voltage setpoint corresponding to the MPP. The waveform modification module 230 is inactive during continuous mode and passes the three-phase required current $I3\phi_{req}$ without any modification.

When operating in a burst mode, the inverter 102 stores energy during a storage period of one or more AC grid voltage cycles of the master phase (i.e., $N_{off}$ grid cycles as determined by the burst mode/MPPT/DC voltage controller 208). In some embodiments, the number of grid cycles $N_{off}$ for the storage period may be determined such that a ripple voltage remains below a certain threshold. Following the storage period, the stored energy is bursted (i.e., coupled) to the AC grid during a burst period of one or more grid voltage cycles of the master phase). For bursting the stored energy during the burst period, the burst mode/MPPT/DC voltage controller 208 determines a burst current, for example in accordance with the amount of energy stored during the storage period. During the burst period, the DC-AC conversion circuit 206 generates the burst current on each phase (i.e., $I_{B1}$, $I_{B2}$, and $I_{B3}$ are generated on phase 1, phase 2, and phase 3 output lines, respectively, from the DC-AC conversion circuit 206) as driven by the burst mode/MPPT/DC voltage controller 208 and the conversion control module 210. The resulting three-phase burst current $I3\phi_B$ from the DC-AC conversion circuit 206 is coupled to the waveform modification module 230.

During the burst period, the waveform modification module 230 is activated and multiplies the three-phase AC burst current $I3\phi_B$ from the DC-AC conversion circuit 206 (i.e., the burst currents $I_{B1}$, $I_{B2}$, and $I_{B3}$) by a modification waveform to generate a modified three-phase AC burst current $I3\phi_{MB}$ output from the inverter (i.e., modified burst currents $I_{MB1}$, $I_{MB2}$, and $I_{MB3}$ on first phase output line P1, second phase output line P2, and third phase output line P3, respectively). The modification waveform is a symmetrical waveform with respect to a grid voltage cycle of the master phase and comprises an attack period from 0° to 120°, a stable period from 120° to 240°, and a decay period from 240° to 360° (in other embodiments, the modification waveform is symmetrical across one or more grid voltage cycles based on the number of cycles in the burst period). During the attack period, the modification waveform starts at zero and rises to a peak value. During the stable period, the modification waveform remains flat at the peak value. During the decay period, the modification waveform decays from the peak value down to zero. As such, each phase of the modified burst current $I3\phi_{MB}$ has a value of zero at both the beginning and the end of the burst period, thereby mitigating negative effects due to an abrupt power transfer when bursting power to the three-phase AC line and, due to the symmetry of the modification waveform, ensuring that random bursting on a large number of inverters 102 yields a smooth aggregate current waveform. In some embodiments, the modification waveform may have a trapezoidal shape. In other embodiments, the modification waveform may follow a raised cosine waveform, such as $0.5*(1-\cos(\text{angle}))$ from 0 to pi, during the attack period while being symmetrical around a center point; in such embodiments, each phase of the modified burst current $I3\phi_{MB}$ has a slope of zero as well as a value of zero at the beginning and end of the burst period. In still other embodiments, the modification waveform may be any other waveform which goes from 0 to 1, for example, during the attack period and is symmetrical around the 0.5 level.

The conversion control module 210 comprises at least one central processing unit (CPU) 212, which is coupled to support circuits 214 and to a memory 216. The CPU 212 may comprise one or more conventionally available microprocessors or digital signal processors (DSPs); additionally or alternatively, the CPU 212 may include one or more application specific integrated circuits (ASIC). The support circuits 214 are well known circuits used to promote functionality of the CPU 212. Such circuits include, but are not limited to, a cache, power supplies, clock circuits, buses, network cards, input/output (I/O) circuits, and the like. The conversion control module 210 may be implemented using a general purpose processor that, when executing particular software, becomes a specific purpose processor for performing various embodiments of the present invention.

The memory 216 may comprise random access memory, read only memory, removable disk memory, flash memory, and various combinations of these types of memory. The memory 216 is sometimes referred to as main memory and may, in part, be used as cache memory or buffer memory. The memory 216 generally stores the operating system (OS) 218 of the conversion control module 210. The OS 218 may be one of a number of commercially available operating systems such as, but not limited to, Linux, Real-Time Operating System (RTOS), and the like.

The memory 216 may store various forms of application software, such as a conversion controller 220 for controlling the operation of the DC-AC conversion circuit 206 to convert a DC input current to the required three-phase current $I3\phi_{req}$ during continuous mode (i.e., $I_{req1}$, $I_{req2}$, and $I_{req3}$) or to the three-phase burst current $I3\phi_B$ during burst mode (i.e., $I_{B1}$, $I_{B2}$, and $I_{B3}$). The memory 216 may further store a waveform modification controller 224 (i.e., application software) for implementing one or more embodiments of the present invention. For example, the waveform modification controller 224 may control waveform modification by allowing the three-phase current $I3\phi_{req}$ to remain unaltered by the waveform modification module 230 during continuous mode operation and causing the three-phase burst current $I3\phi_B$ to be modified by the waveform modification module 230 during burst mode operation. In some embodiments, the waveform modification controller 224 may select a particular waveform (e.g., from one or more waveforms stored in a database) for use by the waveform modification module 230 in modifying the three-phase burst current $I3\phi_B$; in other embodiments, the modification curve may be hard-wired.

The memory 216 may further comprise a database 222 for storing data related to the DC-AC power conversion and/or data related to processing performed by the waveform modification module 230, such as sampled DC and AC voltage and current values, instructions regarding a master phase for the inverter 102, one or more modification waveforms for use by the waveform modification module 230, one or more thresholds for determining burst or continuous mode, and the like. In some embodiments, the conversion controller 220, database 222, and/or waveform modification controller 224, or portions thereof, may be implemented in software, firmware, hardware, or a combination thereof.

Figure 3:
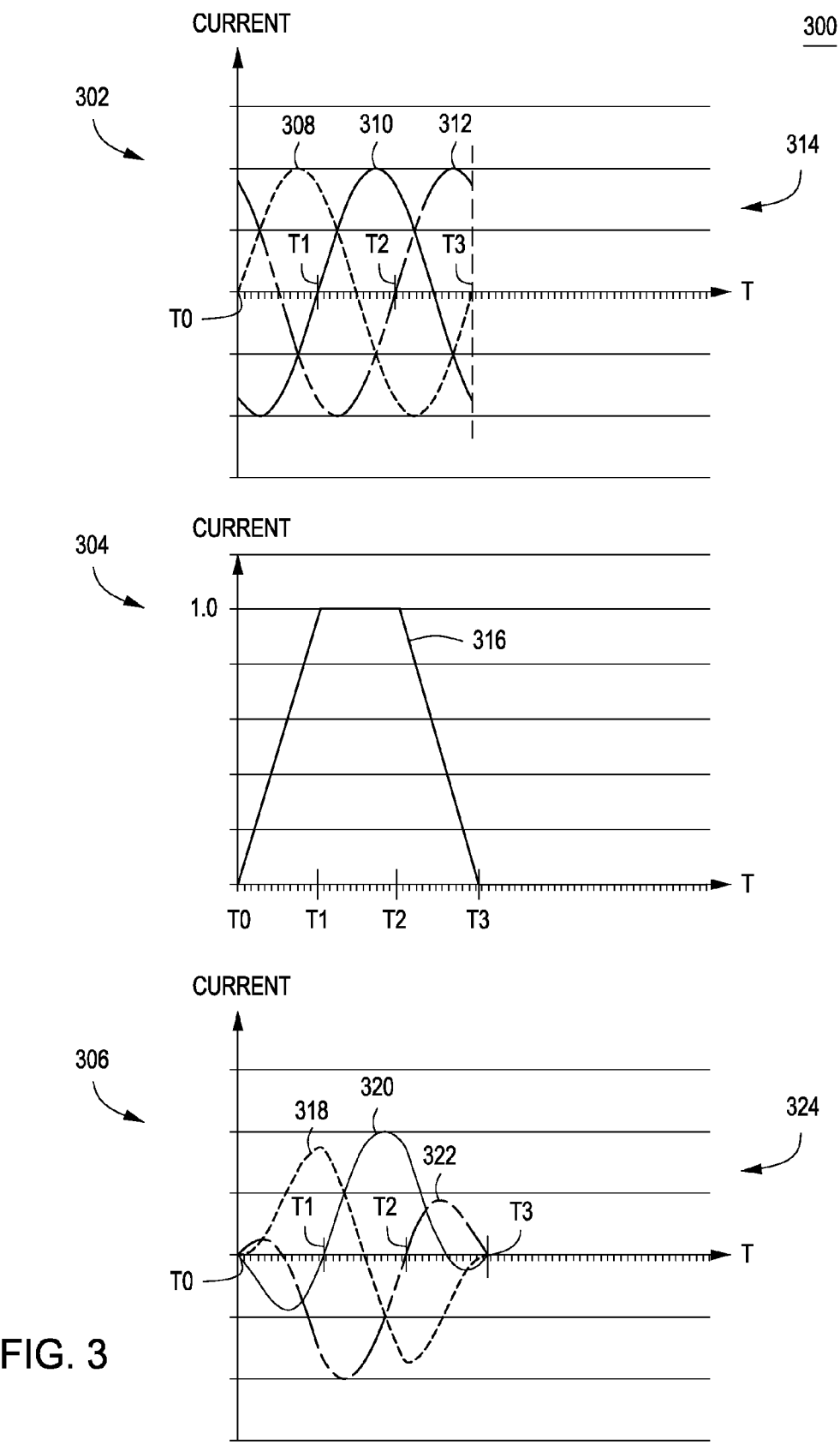
FIG. 3 is a set of graphs depicting a three-phase burst current waveform, a modification waveform, and a modified burst current waveform in accordance with one or more embodiments of the present invention.

FIG. 3 is a set of graphs 300 depicting a three-phase burst current waveform 314, a modification waveform 316, and a modified burst current waveform 324 in accordance with one or more embodiments of the present invention.

Graph 302 comprises the three-phase burst current waveform 314 which depicts a three-phase burst current 139B generated by the DC-AC conversion circuit 206 when operating in burst mode. The burst current waveform 314 comprises three sinusoidal waveforms: a first phase burst current waveform 308 ("$I_{B1}$ waveform 308"), a second phase burst current waveform 310 ("$I_{B2}$ waveform 310"), and a third phase burst current waveform 312 ("$I_{B3}$ waveform 312") depicting a first, a second, and a third phase of burst current, respectively (i.e., $I_{B1}$, $I_{B2}$, and $I_{B3}$, respectively).

Graph 304 comprises the modification waveform 316 which follows a linear function during an attack period and is symmetric about a cycle of the master phase. Graph 306 comprises the modified burst current waveform 324 that depicts the modified three-phase burst current $I3\phi_{MB}$ output from the inverter 102 during burst mode. The modified burst current waveform 324 comprises a modified first phase burst current waveform 318 ("$I_{MB1}$ waveform 318"), a modified second phase burst current waveform 320 ("$I_{MB2}$ waveform 320"), and a modified third phase burst current waveform 322 ("$I_{MB3}$ waveform 522") depicting a modified first, second, and a third phase of burst current, respectively (i.e., $I_{MB1}$, $I_{MB2}$, and $I_{MB3}$, respectively). The $I_{MB1}$ waveform 318, $I_{MB2}$ waveform 320, and $I_{MB3}$ waveform 322 are generated by multiplying the $I_{B1}$ waveform 308, $I_{B2}$ waveform 310, and $I_{B3}$ waveform 312, respectively, by the modification waveform 316.

In the embodiment depicted in FIG. 3, the first phase of the grid waveform acts as the master phase and begins a cycle at time T0. At T0, an energy storage period ends and a burst period begins. The $I_{B1}$ waveform 308 is in synch with the master phase and begins a cycle with a value of zero at T0 (i.e., at 0°). The $I_{B2}$ waveform 310 is phase-shifted by 120° with respect to the $I_{B1}$ waveform 308 and is at 87% of its negative peak value. The $I_{B3}$ waveform 312 is phase-shifted by 240° with respect to the $I_{B1}$ waveform 308 and is at 87% of its peak value. The modification waveform 316 has a value of zero; the $I_{MB1}$ waveform 318, the $I_{MB2}$ waveform 320, and the $I_{MB3}$ waveform 322 each have a value of zero.

From time T0 to time T1 (i.e., from 0° to 120°), each phase of the three-phase burst current waveform 314 is sinusoidally shaped. The modification waveform 316 is in an attack period and follows a linear function (angle/120).

At any given time t between T0 and T1, the value of the $I_{MB1}$ waveform 318 is equal to the product of the $I_{B1}$ waveform 308 at time t and the modification waveform 316 at time t; the value of the $I_{MB2}$ waveform 320 is equal to the product of the $I_{B2}$ waveform 310 at time t and the modification waveform 316 at time t; and the value of the $I_{MB3}$ waveform 322 is equal to the product of the $I_{B3}$ waveform 312 at time t and the modification waveform 316 at time t.

At time T1, i.e., at a phase of 120°, the $I_{B1}$ waveform 308 is at 87% of its peak value, the $I_{B2}$ waveform 310 has a value of 0, and the $I_{B3}$ waveform 312 is at 87% of its negative peak value. The $I_{MB1}$ waveform 318, the $I_{MB2}$ waveform 320, and the $I_{MB3}$ waveform 322 have values equivalent to the $I_{B1}$ waveform 308, the $I_{B2}$ waveform 310, and the $I_{B3}$ waveform 312, respectively. Thus, each phase of the three-phase modified burst current waveform 324 begins the burst period having a value and a phase of zero and "ramps up" to the value of the corresponding phase of the burst current waveform 314 at T1.

From time T1 to T2, i.e., from 120° and 240°, each phase of the three-phase burst current waveform 314 continues to follow a sinusoidal shape and the modification waveform 316 remains at the stable value of 1.0. The values of the $I_{MB1}$ waveform 318, the $I_{MB2}$ waveform 320, and the $I_{MB3}$ waveform 322 are equivalent to the values of the $I_{B1}$ waveform 308, the $I_{B2}$ waveform 310, and the $I_{B3}$ waveform 312, respectively.

At time T2, i.e., at 240°, the $I_{B1}$ waveform 308 is increasing and is at 87% of its peak negative value. The $I_{B2}$ waveform 310 is declining and is at 87% of its peak value. The $I_{B3}$ waveform 312 has a value of 0 and is increasing toward its peak value. The modification waveform 316 has a value of 1.0. The values of the $I_{MB1}$ waveform 318, the $I_{MB2}$ waveform 320, and the $I_{MB3}$ waveform 322 are equivalent to the values of the $I_{B1}$ waveform 308, the $I_{B2}$ waveform 310, and the $I_{B3}$ waveform 312, respectively.

From time T2 to T3, i.e., from 240° and 360°, each phase of the three-phase burst current waveform 314 continues to follow a sinusoidal shape. The modification waveform 316 is in a decay period symmetric with respect to the attack period and linearly declines from its stable value of 1.0 to 0. As described above, at any given time t between T2 and T3, the value of the $I_{MB1}$ waveform 318 is equal to the product of the $I_{B1}$ waveform 308 at time t and the modification waveform 316 at time t; the value of the $I_{MB2}$ waveform 320 is equal to the product of the $I_{B2}$ waveform 310 at time t and the modification waveform 316 at time t; and the value of the $I_{MB3}$ waveform 322 is equal to the product of the $I_{B3}$ waveform 312 at time t and the modification waveform 316 at time t.

At time T3, i.e., at 360°, the $I_{B1}$ waveform 308 has a value of zero, the $I_{B2}$ waveform 310 is at 87% of its negative peak value, and the $I_{B3}$ waveform 312 is at 87% of its peak value. The modification waveform 316, the $I_{MB1}$ waveform 318, the $I_{MB2}$ waveform 320, and the $I_{MB3}$ waveform 322 each have a value of 0. Thus, from T2 to T3, each phase of the modified burst current waveform 324 begins at the value of the corresponding phase of the burst current waveform 314 at T2 (i.e., at 240°) and decays to a value of zero by the end of the cycle for the master phase.

Subsequent to T3, the inverter 102 begins an energy storage period and the burst current waveform 314, the modification waveform 316, and the modified burst current waveform 324 each have a value of zero during the energy storage period.

In some other embodiments, the stable value for the modification waveform 316 may be different from 1.0. Additionally or alternatively, the modification waveform 316 may have a non-trapezoidal shape, for example comprising a non-linear function between times T0 to T1 (i.e., the attack period) and T2 to T3 (i.e., the decay period) while remaining symmetric across one or more of the master phase cycles. The modification waveform 316 may comprise any function having a slope and ranging from zero to the stable value during the attack period and from the stable value to zero during the decay period, while being symmetric across one or more of the master phase cycles.

Figure 4:
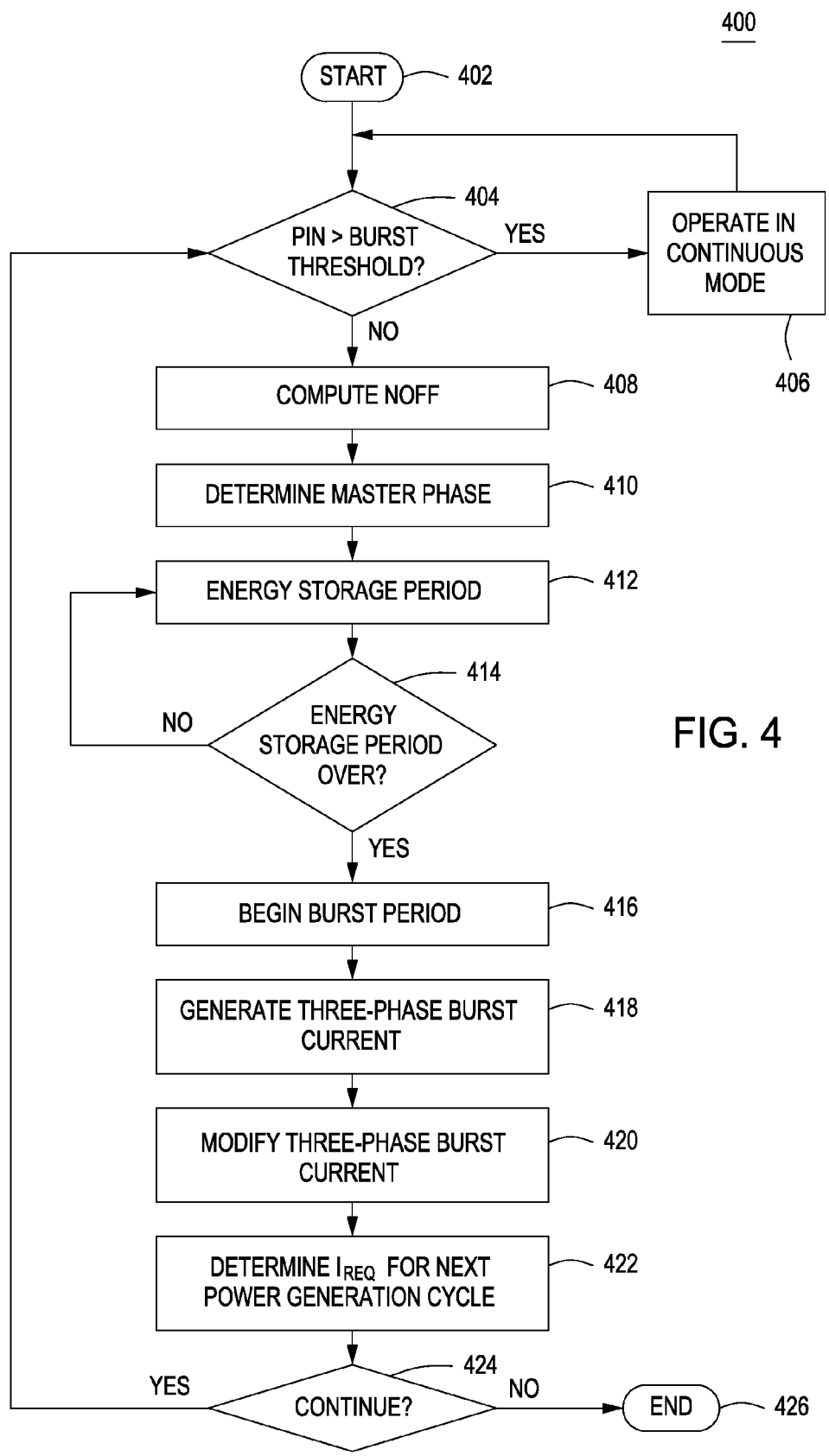
FIG. 4 is a flow diagram of a method for generating three-phase AC current in accordance with one or more embodiments of the present invention.

FIG. 4 is a flow diagram of a method 400 for generating three-phase AC current in accordance with one or more embodiments of the present invention. In some embodiments, such as the embodiment described below, a plurality of power conversion devices, such as the DC-AC inverters 102, are coupled to a plurality of PV modules in a one-to-one correspondence; alternatively, one or more of the DC-AC inverters may each be coupled to a plurality of PV modules and/or may receive DC input from another source of DC power. In some embodiments, a DC-DC converter may be coupled between the PV module or modules and the DC-AC inverter.

The inverters convert DC power from the PV module to multi-phase power, for example three-phase AC power that is coupled to a three-phase AC line, such as a commercial power grid (also referred to as "grid"). The method 400 may be utilized by each of the inverters for generating the three-phase AC power. In some alternative embodiments, the inverters may generate two-phase AC power and the method 400 may be utilized by each of the inverters for generating the two-phase AC power.

The method 400 begins at step 402 and proceeds to step 404. At step 404, a determination is made whether the input power received by an inverter from the corresponding PV module exceeds a burst mode threshold, e.g., the burst mode threshold $P_B$ previously described. If the input power is greater than the burst mode threshold, the PV module is generating sufficient power to be efficiently converted by the corresponding inverter, and the method 400 proceeds to step 406. At step 406, the inverter is operated in continuous mode and generates a three-phase AC current (i.e., $I3\phi_{req}$ as previously described) that is synchronously coupled to the grid. If the inverter has not previously been generating any power (e.g., if the inverter has just become activated), a nominal value for a DC voltage setpoint may be utilized to determine an initial value for $I_{req}$. If, at step 404, it is determined that the input power does not exceed the burst mode threshold, the method 400 proceeds to step 408.

At step 408, the inverter is operated in burst mode and a maximum number of grid voltage cycles for each energy storage period (i.e., $N_{off}$) is determined, for example based on a burst mode ripple voltage threshold. At step 410, a master phase for the inverter is determined. The master phase is the grid phase to which a particular inverter synchronizes its burst periods. In some embodiments, the inverter may determine which phase should act as its master phase based on an identification of the inverter (e.g., a serial number). In other embodiments, the inverter may be randomly assigned a master phase, for example by a controller such as the controller 108, or other similar techniques for determining the inverter's master may be utilized. In some alternative embodiments, the master phase for the inverter may be based on the wiring techniques for wiring the inverter to the grid.

The method 400 proceeds to step 412. At step 412, the inverter operates in an energy storage period. The energy storage period starts at the beginning of the next cycle of the master phase and lasts for $N_{off}$ cycles of the master phase. During the energy storage period, the inverter does not produce any output power, and power generated by the PV module is stored in the inverter in an energy storage device, such as the capacitor 204. At step 414, a determination is made whether the energy storage period is over, i.e., whether $N_{off}$ cycles of the master phase have been completed. If the energy storage period is not over, the method 400 returns to step 412 and the inverter continues to store energy. If the energy storage period is over, the method 400 proceeds to step 416.

At step 416, a burst period begins and the inverter begins to generate power. The burst period is synchronized with the master phase for the inverter (i.e., the burst period starts at the beginning of a cycle of the master phase). In some embodiments, the burst period may be a single grid cycle of the master phase. At step 418, a DC-AC conversion circuit of the inverter generates a three-phase burst current $I3\phi_B$ as previously described (i.e., $I_{B1}$, $I_{B2}$, and $I_{B3}$ are generated on phase 1, phase 2, and phase 3 output lines from the DC-AC conversion circuit,). If the inverter has not previously been generating any power (e.g., if the inverter has just become activated), a nominal value for a DC voltage setpoint may be utilized to determine an initial value for $I_B$.

The method 400 proceeds to step 420, where the three-phase burst current $I3\phi_B$ is modified, resulting in a modified three-phase burst current $I3\phi_{MB}$ as the output current from the inverter. In one embodiment, the modified three-phase burst current $I3\phi_{MB}$ comprises the product of the three-phase burst current $I3\phi_B$ and a modification waveform, such as the modification waveform 316. The modification waveform is symmetrical across a cycle of the master phase and comprises an attack period from 0° to 120°, a stable period from 120° to 240°, and a decay period from 240° to 360°. In some embodiments, the modification waveform rises linearly from zero to a stable value during the attack period, remains flat at the stable value during the stable period, and decays linearly from the stable value back down to zero during the decay period. As such, each phase of the modified three-phase burst current $I3\phi_{MB}$ has a value of zero at the beginning and the end of the burst period (i.e., at the beginning and the end of the master phase cycle). In other embodiments, the modification waveform may follow other functions during the attack and decay periods and/or may span more than one grid cycle, but always begins the attack period at a value of zero and remains symmetrical with respect to one or more grid cycles (based on the number of grid cycles in the burst period) for the master phase.

In some embodiments, a plurality of inverters executing the method 400 is coupled to the grid. In order to achieve a substantially balanced three-phase current from the plurality of inverters, the master phase for each inverter may be randomly assigned or intentionally varied by one or more of the techniques previously described. For a sufficient number of inverters, such techniques ensure that the grid phases 1, 2, and 3 are each utilized as a master phase by approximately or exactly equivalent numbers of inverters, resulting in a cumulative output from the inverters of a substantially balanced three-phase current.

The method 400 proceeds to step 422, where the required current $I_{req}$ is determined for the next power generation cycle, as previously described. At step 424, a decision is made whether to continue operating the inverter. If the decision at step 424 is to continue operating the inverter, the method 400 returns to step 404. If the decision at step 424 is to discontinue inverter operation the inverter, the method 400 proceeds to step 426 where it ends.

Figure 5:
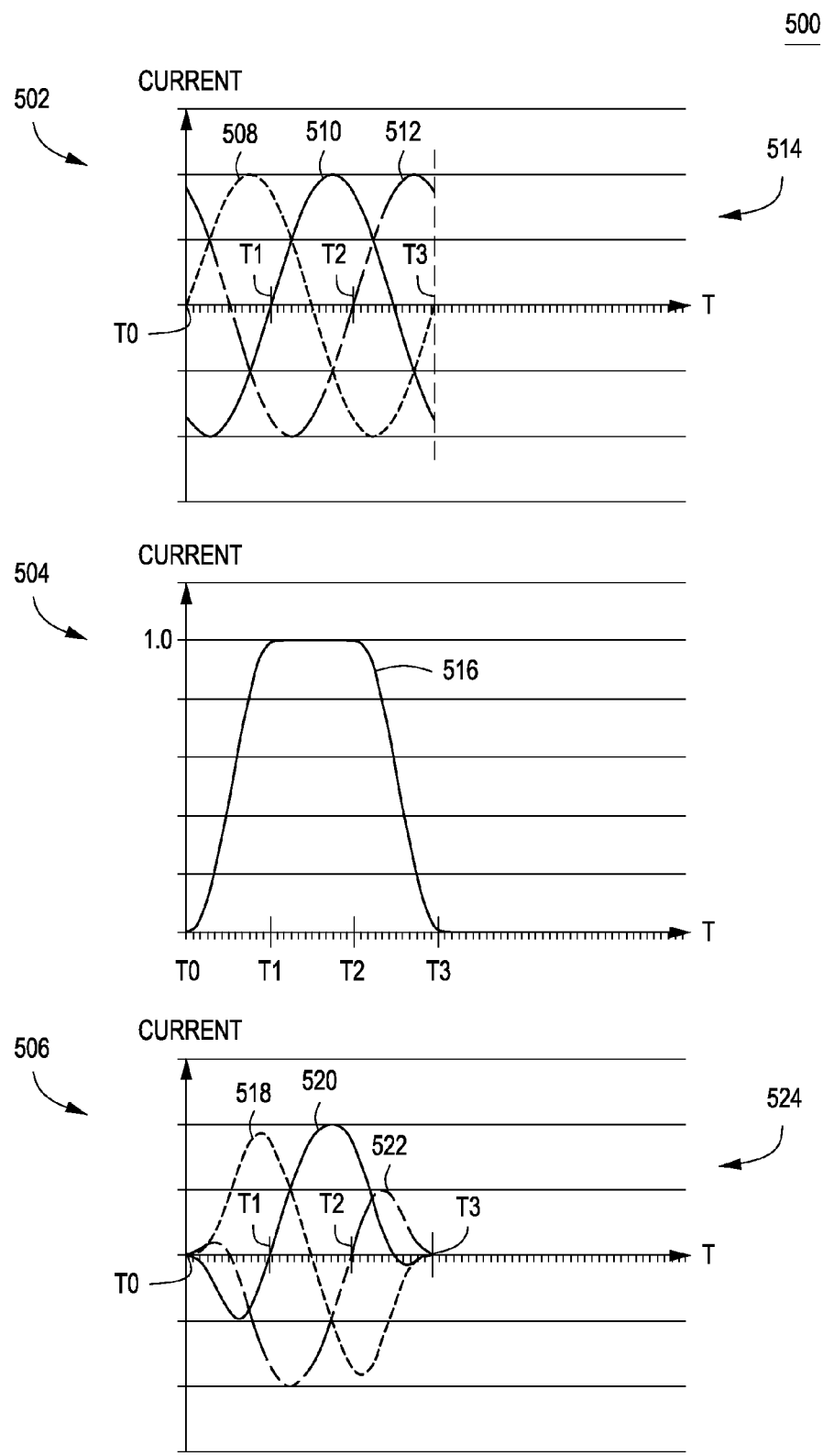
FIG. 5 is a set of graphs depicting a three-phase burst current waveform, a modification waveform, and a modified burst current waveform in accordance with one or more other embodiments of the present invention.

FIG. 5 is a set of graphs 500 depicting a three-phase burst current waveform 514, a modification waveform 516, and a modified burst current waveform 524 in accordance with one or more other embodiments of the present invention.

Graph 502 comprises the three-phase burst current waveform 514 which depicts a three-phase burst current 139B generated by the DC-AC conversion circuit 206 when operating in burst mode. The burst current waveform 514 comprises three sinusoidal waveforms: a first phase burst current waveform 508 ("$I_{B1}$ waveform 508"), a second phase burst current waveform 510 ("$I_{B2}$ waveform 510"), and a third phase burst current waveform 512 ("$I_{B3}$ waveform 512") depicting a first, a second, and a third phase of burst current, respectively (i.e., $I_{B1}$, $I_{B2}$, and $I_{B3}$, respectively).

Graph 504 comprises the modification waveform 516, which follows a raised cosine function 0.5*(1−cos(angle)) from 0 to pi during an attack period and is symmetric about a cycle of the master phase. Graph 506 comprises the modified burst current waveform 524 that depicts the modified three-phase burst current $I3\phi_{MB}$ output from the inverter 102 during burst mode. The modified burst current waveform 524 comprises a modified first phase burst current waveform 518 ("$I_{MB1}$ waveform 518"), a modified second phase burst current waveform 520 ("$I_{MB2}$ waveform 520"), and a modified third phase burst current waveform 522 ("$I_{MB3}$ waveform 522") depicting a modified first, second, and third phase of burst current, respectively (i.e., $I_{MB1}$, $I_{MB2}$, and $I_{MB3}$, respectively). The $I_{MB1}$ waveform 518, $I_{MB2}$ waveform 520, and $I_{MB3}$ waveform 522 are generated by multiplying the $I_{B1}$ waveform 508, $I_{B2}$ waveform 510, and $I_{B3}$ waveform 512, respectively, by the modification waveform 516.

In the embodiment depicted in FIG. 5, the first phase of the grid waveform acts as the master phase and begins a cycle at time T0. At T0, an energy storage period ends and a burst period begins. The $I_{B1}$ waveform 508 is in synch with the master phase and begins a cycle with a value of zero at T0 (i.e., at 0°). The $I_{B2}$ waveform 510 is phase-shifted by 120° with respect to the $I_{B1}$ waveform 508 and is at 87% of its negative peak value. The $I_{B3}$ waveform 512 is phase-shifted by 240° with respect to the $I_{B1}$ waveform 508 and is at 87% of its peak value. The modification waveform 516 has a value of zero; the $I_{MB1}$ waveform 518, the $I_{MB2}$ waveform 520, and the $I_{MB3}$ waveform 522 each have a value as well as a slope of zero.

From time T0 to time T1, i.e., from 0° to 120°, each phase of the three-phase burst current waveform 514 is sinusoidally shaped. The modification waveform 516 is in an attack period and follows the raised cosine function 0.5*(1−cos (angle)) from 0 to pi. At any given time t between T0 and T1, the value of the $I_{MB1}$ waveform 518 is equal to the product of the $I_{B1}$ waveform 508 at time t and the modification waveform 516 at time t; the value of the $I_{MB2}$ waveform 520 is equal to the product of the $I_{B2}$ waveform 510 at time t and the modification waveform 516 at time t; and the value of the $I_{MB3}$ waveform 522 is equal to the product of the $I_{B3}$ waveform 512 at time t and the modification waveform 516 at time t.

At T1, i.e., 120°, the $I_{B1}$ waveform 508 is at 87% of its peak value, the $I_{B2}$ waveform 510 is at 0, and the $I_{B3}$ waveform 512 is at 87% of its negative peak value. The modification waveform 516 is at a stable value of 1.0. The $I_{MB1}$ waveform 518, the $I_{MB2}$ waveform 520, and the $I_{MB3}$ waveform 522 have values equivalent to the $I_{B1}$ waveform 508, the $I_{B2}$ waveform 510, and the $I_{B3}$ waveform 512, respectively. Thus, each phase of the three-phase modified burst current waveform 524 begins the burst period having a value and a slope of zero and reaches the value of the corresponding phase of the burst current waveform 514 at T1.

From time T1 to time T2, i.e., from 120° and 240°, each phase of the three-phase burst current waveform 514 continues to follow a sinusoidal shape and the modification waveform 516 remains at the stable value of 1.0. The values of the $I_{MB1}$ waveform 518, the $I_{MB2}$ waveform 520, and the $I_{MB3}$ waveform 522 are equivalent to the values of the $I_{B1}$ waveform 508, the $I_{B2}$ waveform 510, and the $I_{B3}$ waveform 512, respectively.

At time T2, i.e., at 240°, the $I_{B1}$ waveform 508 is at 87% of its peak negative value. The $I_{B2}$ waveform 510 is at 87% of its peak value. The $I_{B3}$ waveform 512 has a value of zero. The modification waveform 516 has a value of 1.0. The values of the $I_{MB1}$ waveform 518, the $I_{MB2}$ waveform 520, and the $I_{MB3}$ waveform 522 are equivalent to the values of the $I_{B1}$ waveform 508, the $I_{B2}$ waveform 510, and the $I_{B3}$ waveform 512, respectively.

From time T2 to T3, i.e., from 240° and 360°, each phase of the three-phase burst current waveform 514 continues to follow a sinusoidal shape. The modification waveform 516 is in a decay period symmetric with respect to the attack period. At any given time t between T2 and T3, the value of the $I_{MB1}$ waveform 518 is equal to the product of the $I_{B1}$ waveform 508 at time t and the modification waveform 516 at time t; the value of the $I_{MB2}$ waveform 520 is equal to the product of the $I_{B2}$ waveform 510 at time t and the modification waveform 516 at time t; and the value of the $I_{MB3}$ waveform 522 is equal to the product of the $I_{B3}$ waveform 512 at time t and the modification waveform 516 at time t.

At time T3, i.e., at 360°, the $I_{B1}$ waveform 508 has a value of zero, the $I_{B2}$ waveform 510 is at 87% of its negative peak value, and the $I_{B3}$ waveform 512 is at 87% of its peak value. The modification waveform 516, the $I_{MB1}$ waveform 518, the $I_{MB2}$ waveform 520, and the $I_{MB3}$ waveform 522 each have a value of zero. Thus, from T2 to T3, each phase of the modified burst current waveform 524 begins at the value of the corresponding phase of the burst current waveform 514 and decays to a value of zero by the end of the cycle for the master phase.

Subsequent to T3, the inverter 102 begins an energy storage period and the burst current waveform 514, the modification waveform 516, and the modified burst current waveform 524 each have a value of zero during the energy storage period.

The foregoing description of embodiments of the invention comprises a number of elements, devices, circuits and/or assemblies that perform various functions as described. These elements, devices, circuits, and/or assemblies are exemplary implementations of means for performing their respectively described functions.

In certain embodiments of the present invention, current taken from a multi-phase AC line, such as a commercial power grid, may be modified as described above; i.e., some embodiments of the present invention may be utilized during AC/DC conversion. Some embodiments of the present invention may be utilized for bidirectional applications (i.e., taking energy in and out of a multi-phase AC line at different times), for example uninterruptible power supplies (UPS), advanced Hybrid Electrical Vehicle chargers, energy storage appliances, and the like. One or more embodiments of the present invention may also be utilized for applications such as lighting, IT equipment supplies, battery chargers, and the like.

While the foregoing is directed to embodiments of the present invention, other and further embodiments of the invention may be devised without departing from the basic scope thereof, and the scope thereof is determined by the claims that follow.

The invention claimed is:

1. A power conversion apparatus, comprising:
a power conversion module converting a DC current to an AC current having multiple phases; and
a waveform modification module, coupled to the power conversion module, modifying, while operating during a burst period of a burst operating mode, the AC current to generate a modified AC current, the modified AC current having a same number of phases as the AC current, wherein all phases of the multiple phases of the modified AC current: (i) simultaneously have a value of zero at a beginning of an AC line cycle of a particular phase of a multi-phase AC line coupled to the power conversion module, and (ii) are applied concurrently to the multi-phase AC line, and wherein the burst period is immediately preceded by a storage period during which the power conversion module stores received power, while generating no output power, for a predetermined number of AC cycles.

2. The apparatus of claim 1, wherein the waveform modification module multiplies the AC current by a modification waveform to generate the modified AC current.

3. The apparatus of claim 2, wherein the modification waveform is symmetric across at least one AC line cycle.

4. The apparatus of claim 3, wherein the modification waveform increases from zero to a stable value during an attack period, remains at the stable value during a stable period, and decays from the stable value to zero during a decay period.

5. The apparatus of claim 4, wherein the attack period spans a first third of the at least one AC line cycle, the stable period spans a second third of the at least one AC line cycle, and the decay period spans a remaining third of the at least one AC line cycle.

6. The apparatus of claim 1, wherein the modified AC current is synchronized to a master phase and the master phase corresponds to the particular phase.

7. The apparatus of claim 6, wherein the master phase is determined based on a unique identification number corresponding to the power conversion module.

8. The apparatus of claim 1, wherein each phase of the modified AC current has a slope of zero at the beginning of the AC line cycle.

9. A power conversion method, comprising:
converting, by a power conversion module, a DC current to an AC current having multiple phases; and
modifying, while operating during a burst period of a burst operating mode, the AC current to generate a modified AC current, the modified AC current having a same number of phases as the AC current, wherein all phases of the multiple phases of the modified AC current: (i) simultaneously have a value of zero at a beginning of an AC line cycle of a particular phase of a multi-phase AC line coupled to the power conversion module, and (ii) are applied concurrently to the multi-phase AC line; and wherein the burst period is immediately preceded by a storage period during which the power conversion module stores received power, while generating no output power, for a predetermined number of AC cycles.

10. The method of claim 9, wherein modifying the AC current comprises multiplying the AC current by a modification waveform.

11. The method of claim 10, wherein the modification waveform is symmetric across at least one AC line cycle.

12. The method of claim 11, wherein the modification waveform increases from zero to a stable value during an attack period, remains at the stable value during a stable period, and decays from the stable value to zero during a decay period.

13. The method of claim 12, wherein the attack period spans a first third of the at least one AC line cycle, the stable period spans a second third of the at least one AC line cycle, and the decay period spans a remaining third of the at least one AC line cycle.

14. The method of claim 9, wherein the particular phase corresponds to a master phase and the modified AC current is synchronized to the master phase.

15. The method of claim 14, further comprising determining the master phase based on a unique identification number corresponding to the power conversion module.

16. The method of claim 9, wherein each phase of the modified AC current has a slope of zero at the beginning of the AC line cycle.

17. A power conversion system, comprising:
a plurality of power conversion modules, wherein each power conversion module of the plurality of power conversion modules converts a DC current to an AC current having multiple phases; and
a plurality of waveform modification modules coupled to the plurality of power conversion modules in a one-to-one correspondence, wherein each waveform modification module modifies, while operating during a burst period of a burst operating mode, the AC current to generate a modified AC current, wherein all phases of the multiple phases of the modified AC current: (i) simultaneously have a value of zero at a beginning of an AC line cycle of a particular phase of a multi-phase AC line coupled to a corresponding power conversion module, and (ii) are applied concurrently to the multi-phase AC line; and wherein the burst period is immediately preceded by a storage period during which the corresponding power conversion module stores received power, while generating no output power, for a predetermined number of AC cycles.

18. The system of claim 17, wherein (i) for a first subset of power conversion modules in the plurality of power conversion modules, the modified AC current from each power conversion module of the first subset is synchronized to a first master phase, (ii) for a second subset of power conversion modules in the plurality of power conversion modules, the modified AC current from each power conversion module of the second subset is synchronized to a second master phase, and (iii) for a third subset of power conversion modules in the plurality of power conversion modules, the modified AC current from each power conversion module of the third subset is synchronized to a third master phase.

19. The system of claim 18, wherein assignment of the first, the second, and the third master phase among the plurality of power conversion modules is randomly distributed.

20. The system of claim 18, wherein each waveform modification module multiplies the AC current by a modification waveform to generate the modified AC current.

* * * * *